United States Patent
Liu et al.

(10) Patent No.: US 11,800,425 B2
(45) Date of Patent: Oct. 24, 2023

(54) WSN CLUSTERING ROUTING METHOD BASED ON OPTIMIZATION WITH SALP SWARM ALGORITHM

(71) Applicant: Sun Yat-sen University, Guangzhou (CN)

(72) Inventors: Xingcheng Liu, Guangzhou (CN); Qiang Tu, Guangzhou (CN)

(73) Assignee: Sun Yat-sen University, Guangzhou (CN)

( * ) Notice: Subject to any disclaimer, the term of this patent is extended or adjusted under 35 U.S.C. 154(b) by 128 days.

(21) Appl. No.: 17/566,735

(22) Filed: Dec. 31, 2021

(65) Prior Publication Data

US 2022/0256431 A1    Aug. 11, 2022

(30) Foreign Application Priority Data

Feb. 7, 2021    (CN) .......................... 202110169675.9

(51) Int. Cl.
*H04W 40/02*    (2009.01)
*H04L 45/122*    (2022.01)
(Continued)

(52) U.S. Cl.
CPC ........ *H04W 40/02* (2013.01); *G06F 18/2323* (2023.01); *H04L 45/122* (2013.01); *H04L 45/42* (2013.01); *H04L 45/48* (2013.01)

(58) Field of Classification Search
CPC .. H04W 40/02; G06F 18/2323; H04L 45/122; H04L 45/42; H04L 45/48
(Continued)

(56) References Cited

U.S. PATENT DOCUMENTS

| 10,222,688 B2 | 3/2019 | Gallager |
| 10,337,997 B2 | 7/2019 | Gallager |

(Continued)

OTHER PUBLICATIONS

Wendi B. Heinzelman et. al., An Application-Specific Protocol Architecture for Wireless Microsensor Networks, IEEE Transactions on wireless communications, Dec. 10,2002pp. 660-670, vol. 1, Issue 4, IEEE, U.S.A.

(Continued)

*Primary Examiner* — Hermon Asres
(74) *Attorney, Agent, or Firm* — True Shepherd LLC; Andrew C. Cheng (57) ABSTRACT

A wireless sensor network (WSN) clustering routing method based on optimization with salp swarm algorithm includes: S1: constructing an objective function by comprehensively considering factors as follows: node residual energy, a distance between cluster head nodes, a distance between a cluster member node and a cluster head node, a distance from a node to a base station, and a number of cluster head nodes; S2: solving the objective function by using a salp swarm algorithm, to find an optimal clustering scheme, and thus dividing the WSN into non-uniform clusters, wherein in each cluster, the cluster member node sends data to the cluster head node in a single-hop manner; S3: constructing a minimum spanning tree with the base station as a root node by using a routing utility function $f(CH_i)$; S4: sending, by the cluster head node, data to the base station through routing organized by the minimum spanning tree.

9 Claims, 6 Drawing Sheets

(51) Int. Cl.
    *H04L 45/42*    (2022.01)
    *H04L 45/48*    (2022.01)
    *G06F 18/2323*  (2023.01)

(58) Field of Classification Search
    USPC ........................................................ 709/238
    See application file for complete search history.

(56) References Cited

U.S. PATENT DOCUMENTS

| | | |
|---|---|---|
| 11,113,042 B2 | 9/2021 | Farivar et al. |
| 2012/0014289 A1* | 1/2012 | Ortega ................. H04W 52/04 370/255 |
| 2013/0029684 A1* | 1/2013 | Kawaguchi ............ H04R 3/005 455/456.1 |
| 2020/0052997 A1* | 2/2020 | Ramanathan ........... H04L 69/22 |

OTHER PUBLICATIONS

Yu Xiuwu et. al., Uneven clustering routing algorithm based on glowworm swarm optimization. Ad Hoc Networks, Jun. 19, 2019, pp. 101923, vol. 93, Elsevier B.V., U.S.A.

* cited by examiner

WSN CLUSTERING ROUTING METHOD BASED ON OPTIMIZATION WITH SALP SWARM ALGORITHM

CROSS-REFERENCE TO RELATED APPLICATIONS

This application claims priority to Chinese Patent Application No. 202110169675.9 with a filing date of Feb. 7, 2021. The content of the aforementioned application, including any intervening amendments thereto, is incorporated herein by reference.

TECHNICAL FIELD

The present disclosure relates to the technical field of wireless sensor network (WSN), and in particular, to a WSN clustering routing method based on optimization with salp swarm algorithm.

BACKGROUND

Wireless Sensor Network (WSN) is one of the emerging information technologies in the $21^{st}$ century, and is listed by Business Week as one of the top ten technologies that will change the world in the $21^{st}$ century. A WSN is a self-organizing system formed by many inexpensive sensor nodes having an information collection function, and is used to sense and collect various information and transmit the collected information to a base station for further processing. Unlike nodes in traditional wireless Ad-hoc networks, WSN nodes are usually powered by limited, non-replaceable batteries, and have limited computing power, communication capability, and energy storage [W. B. Heinzelman, A. P. Chandrakasan, and H. Balakrishnan, "An Application-Specific Protocol Architecture for Wireless Microsensor networks," IEEE Transactions on wireless communications, Vol. 1, No. 4, 2002, pp. 660-670]. Therefore, how to use node energy efficiently to maximize the network lifetime is an important challenge for WSNs.

Due to the limited energy of sensor nodes, it is important to design energy-efficient WSN routing protocols. From the perspective of network topology, WSN routing protocols can be divided into two major categories: planar routing protocols and hierarchical routing protocols [X. Yu, Q. Liu, Y. Liu, et al, "Uneven clustering routing algorithm based on glowworm swarm optimization," Ad Hoc Networks, vol. 93, 2019, pp. 101923]. Low-energy adaptive clustering hierarchy (LEACH) is a typical hierarchical routing protocol. The idea of this protocol is to randomly select cluster head nodes in a round-robin manner and distribute the energy consumption of the whole network to each sensor node equally, so as to reduce the network energy consumption and improve the lifetime of the whole network.

Although LEACH can effectively improve the lifetime of the network, there are still some issues worth discussing in the assumptions of the protocol.

1. In the mechanism of reselecting a cluster head globally by in each round, information that a node is elected as the cluster head needs to be broadcasted, which will waste excessive system resources.

2. The mechanism of randomly selecting cluster heads may lead to a poor clustering effect, which will result in an uneven distribution of cluster heads in the network.

3. The status of residual energy of the cluster head node is not considered, and if a node with little residual energy is selected as the cluster head, the node will die due to rapid energy exhaustion.

4. In a typical single-hop path transmission mode, if the randomly generated cluster head node is far away from the base station, the node will fail as the energy is used up prematurely in the process of forwarding data over a long distance, thus forming a network hole and reducing the lifetime of the network.

The clustering of a wireless sensor network includes selection of a cluster head and cluster formation. Most of the clustering algorithms first consider how to select a cluster head. Usually, in order to balance the network energy consumption, all nodes act as a cluster head in turn. The selection of a cluster head selection faces the following challenges: (1) the network state is constantly changing, e.g., node energy consumption, node death, adding of new nodes; (2) there are many nodes in the network; (3) the selection algorithm needs to be simple and efficient. There are many domestic and foreign optimization algorithms, such as a Particle Swarm Optimization (PSO) algorithm, to achieve optimized network clustering, which can effectively balance the energy consumption of network nodes and extend the lifetime of the network.

In most of the current clustering algorithms, a cluster head is selected only based on the state information of candidate nodes in the process of cluster formation, while the state information of surrounding neighboring nodes is ignored, which leads to the unbalanced energy consumption of cluster nodes and cluster head nodes. Due to the use of single-hop inter-cluster routing, the uneven energy consumption of the cluster heads when transmitting information to the base station is not taken into account; when the base station is located outside a target area, such an algorithm will lead to the death of nodes far from the base station, and the network will have the "energy hole" problem.

SUMMARY

In order to solve the problem of uneven energy consumption distribution of the existing WSN clustering algorithm, the present disclosure provides a WSN clustering routing method based on optimization with salp swarm algorithm, which can effectively balance energy consumption of nodes and achieve the objective of extending the network lifetime.

To implement the foregoing objective of the present disclosure, the following technical solutions are adopted: a WSN clustering routing method based on optimization with salp swarm algorithm, including the following steps:

S1: constructing an objective function by comprehensively considering factors as follows: node residual energy, a distance between cluster head nodes, a distance between a cluster member node and a cluster head node, a distance from a node to a base station, and the number of cluster head nodes;

S2: solving the objective function by using a salp swarm algorithm, to find an optimal clustering scheme, and thus dividing the WSN into non-uniform clusters, wherein in each cluster, the cluster member node sends data to the cluster head node in a single-hop manner;

S3: constructing a minimum spanning tree with the base station as a root node according to residual energy of each cluster head and a distance between each cluster head and the base station; and S4: sending, by the cluster head node, data to the base station in a single-hop and multi-hop combined manner through routing organized by the minimum spanning tree.

Preferably, the objective function is expressed as follows:

$$\min f_{obj} = \omega_1 \cdot f_1 + \omega_2 \cdot f_2 + \omega_3 \cdot f_3 \quad (1)$$

$$f_1 = \Sigma_{i=1}^{N} E(n_i) / \Sigma_{j=1}^{N} E(CH_{s,j}) \quad (2)$$

$$f_2 = \frac{\max_{\forall j=1,2,\ldots,K} \{\Sigma_{\forall n_i \in CH_{s,j}} d(n_i, CH_{s,j}) / |CH_{s,j}|\}}{\min_{\forall j=1,2,\ldots,K} \left\{\sum_{k=1}^{K} d(CH_{s,k}, CH_{s,j})\right\}} \quad (3)$$

$$f_3 = K/N \quad (4)$$

wherein $f_1$ represents an energy evaluation factor of a candidate cluster head node; $\Sigma_{i=1}^{N} E(n_i)$ represents total initial energy of all nodes in the WSN; $\Sigma_{j=1}^{K} E(CH_{s,j})$ represents total energy of all candidate cluster head nodes in a current round; $f_2$ represents a clustering quality evaluation factor;

$$\max_{\forall j=1,2,\ldots,K} \{\Sigma_{\forall n_i \in CH_{s,j}} d(n_i, CH_{s,j}) / |CH_{s,j}|\}$$

represents an intra-cluster compactness evaluation factor, and a value thereof is a maximum value of average Euclidean distances for all clusters and each average Euclidean distance is an average of Euclidean distances for each cluster from cluster member nodes to the cluster head node in the cluster;

$$\min_{\forall j=1,2,\ldots,K} \left\{\sum_{k=1}^{K} d(CH_{s,k}, CH_{s,j})\right\}$$

represents a cluster head dispersity evaluation factor, and a value thereof is a minimum value of distances between cluster head nodes; $f_3$ represents a cluster head quantity evaluation factor; K represents the number of clusters; N represents the number of nodes in the WSN; $n_i$ represents the i-th node; $CH_{s,j}$ represents the j-th cluster head node; $CH_{s,k}$ represents the k-th cluster head node; s represents the s-th salp search particle; $E(n_i)$ represents residual energy of the i-th node; $d(n_i, CH_{s,k})$ represents a minimum Euclidean distance between node i and cluster head node k; $d(CH_{s,j}, CH_{s,k})$ represents a minimum Euclidean distance between cluster head node j and cluster head node k; $\omega_1$ represents a weight coefficient of $f_1$, $\omega_2$ represents a weight coefficient of $f_2$, and $\omega_3$ represents a weight coefficient of $f_3$, and $\omega_1+\omega_2+\omega_3=1$.

Further, providing that the WSN includes N nodes, the WSN is divided into K clusters, the number of candidate cluster head nodes is M, and M»K; then there are $C_M^K$ clustering schemes, and determining an optimal clustering scheme is considered as an optimization problem, which is solved by using the salp swarm algorithm; each salp represents one possible clustering scheme, and performance of the possible clustering scheme is evaluated by using the objective function; Pops salps are used to form a search swarm to search for an optimal solution in $C_M^K$ possible cluster head combinations, to obtain a minimum value of the objective function.

Further, solving the optimization problem by using the salp swarm algorithm is specifically as follows:

D1: Initialize salp positions in a salp population randomly, and on the assumption that a salp population size is Pops, define positions of salps in an N-dimensional search space, where N represents the number of nodes in the WSN. $ub=[ub_1, ub_2, \ldots, ub_N]$ and $lb=[lb_1, lb_2, \ldots, lb_N]$ are an upper limit and a lower limit of a position change range in each dimension respectively. At the same time, first Pops/2 salps are taken as leaders and the remaining Pops/2 salps are taken as followers; a fitness value of each salp particle is calculated according to formula (1) of the objective function, and a position of a particle with a minimum fitness value in the population is used as Foodsource.

D2: Update the salp positions in the salp population.

A position updating formula for the leaders is as follows:

$$\text{leader}_i^j = \begin{cases} F_i + r_1 \cdot ((ub_i - lb_i) \cdot r_2 + lb_i), r_3 \geq 0.5 \\ F_i - r_1 \cdot ((ub_i - lb_i) \cdot r_2 + lb_i), r_3 < 0.5 \end{cases} \quad (5)$$

wherein $\text{leader}_i^j$ a position of the j-th leader in the i-th dimensional space, $ub_i$ and $lb_i$ are an upper limit and a lower limit corresponding to the i-th dimensional position respectively; $F_i$ is a position of Foodsource in the i-th dimensional space, coefficient $r_1$ is an adaptively reduced regulation parameter, which is responsible for balancing global searching and local searching capabilities of the algorithm, and $r_1$ is expressed as follows:

$$r_1 = 2e^{-(4t/T)^2} \quad (6)$$

wherein t represents a current number of iterations; T represents a maximum number of iterations. Coefficients $r_2$ and $r_3$ are random numbers in a range of [0, 1], which determine a movement direction and a movement distance of the j-th particle at a next position in the i-th dimensional space.

A position updating formula for the followers is as follows:

$$\text{follower}_i^j = \frac{1}{2} \cdot (x_i^j + x_i^{j-1}) \quad (7)$$

wherein $\text{follower}_i^j$ represents a position of the j-th follower in the i-th dimensional space, $x_i^j$ and $x_i^{j-1}$ represent positions of two salp particles in front of the j-th follower $\text{follower}_i^j$.

D3: Convert, by using a conversion function, real-number values of position-updated particles in each dimension into discrete values of 0 or 1, where the used conversion function is expressed as follows:

$$T(x_i^j(t)) = 1/(1 + \exp^{-x_i^j(t)}) \quad (8)$$

$$x_i^j(t+1) = \begin{cases} 1, \text{rand} < T(v_i^j(t+1)) \\ 0, \text{rand} \geq T(v_i^j(t+1)) \end{cases} \quad (9)$$

wherein $x_i^j(t+1)$ represents a position of a leader $\text{leader}_i^j(t)$ or a follower $\text{follower}_i^j(t)$ after the (t+1)-th iteration, $T(x_i^j(t))$ represents a conversion probability corresponding to $x_i^j$ in the t-th iteration, and when a value thereof is greater than a random number rand, a value of $x_i^j(t+1)$ is 1, indicating that the i-th node is selected as a cluster head node; when the value of $T(x_i^j(t))$ is less than or equal to the random number rand, the value of $x_i^j(t+1)$ is 0, indicating that the i-th node is selected as the cluster member node, and rand is a random number in a range of [0, 1].

D4: Calculate fitness values of updated salp particles according to formula (1) of the objective function, and save a position of a particle with a minimum fitness value in the current population as Foodsource.

D5: Determine whether a preset iteration ending condition is met; if yes, perform a next step; otherwise, return to step D2.

D6: Use a final position of Foodsource as an optimal clustering scheme, and select a node corresponding to a dimension in which a value of Foodsource is 1 as a cluster head node.

Further, the routing utility function $f(CH_i)$ is expressed as follows:

$$p_i = \begin{cases} \sin k, & d(i, \sin k) < 2r \\ j, & d(i, \sin k) \geq 2r \end{cases} \quad (10)$$

$$j = \arg \min\{\cos t(k), \forall k \in A_i \text{ and } d(k, \sin k) < d(i, \sin k)\} \quad (11)$$

$$\cos t(k) = w \cdot \frac{d^2(i, k) + d^2(k, \sin k)}{d^2(i, \sin k)} + (1-w) \cdot \frac{\overline{E}_{nei}(i)}{E_{cur}(k)} \quad (12)$$

wherein $\overline{E}_{nei}(i)$ represents average energy of all neighboring nodes of node i, and $E_{cur}(k)$ represents a current energy state of node k; $A_i$ represents a set of all neighboring cluster head nodes of cluster head node i; w represents a weigh coefficient and w=0.4; d(•) represents a minimum Euclidean distance between two nodes.

The present disclosure has the following beneficial effects.

In the present disclosure, during cluster head selection, an objective function is constructed by comprehensively considering factors as follows: node residual energy, a distance between cluster head nodes, a distance between the cluster member node and the cluster head, a distance from a node to a base station, and the number of cluster head nodes; the objective function is solved by using a salp swarm algorithm, to find an optimal clustering scheme, and then the whole WSN is divided into non-uniform clusters, thereby effectively balancing energy consumption of WSN nodes. In a data transmission stage, a minimum spanning tree with the base station as a root node is constructed by using a routing utility function $f(CH_i)$, and the cluster head sends data to the base station in a single-hop and multi-hop combined manner through routing organized by the minimum spanning tree. This method can effectively balance energy consumption of the nodes, and achieve the objective of effectively extending the WSN lifespan.

DETAILED DESCRIPTION OF THE EMBODIMENTS

The present disclosure will be described in further detail below in conjunction with the accompanying drawings and specific embodiments.

Embodiment 1

Figure 1:
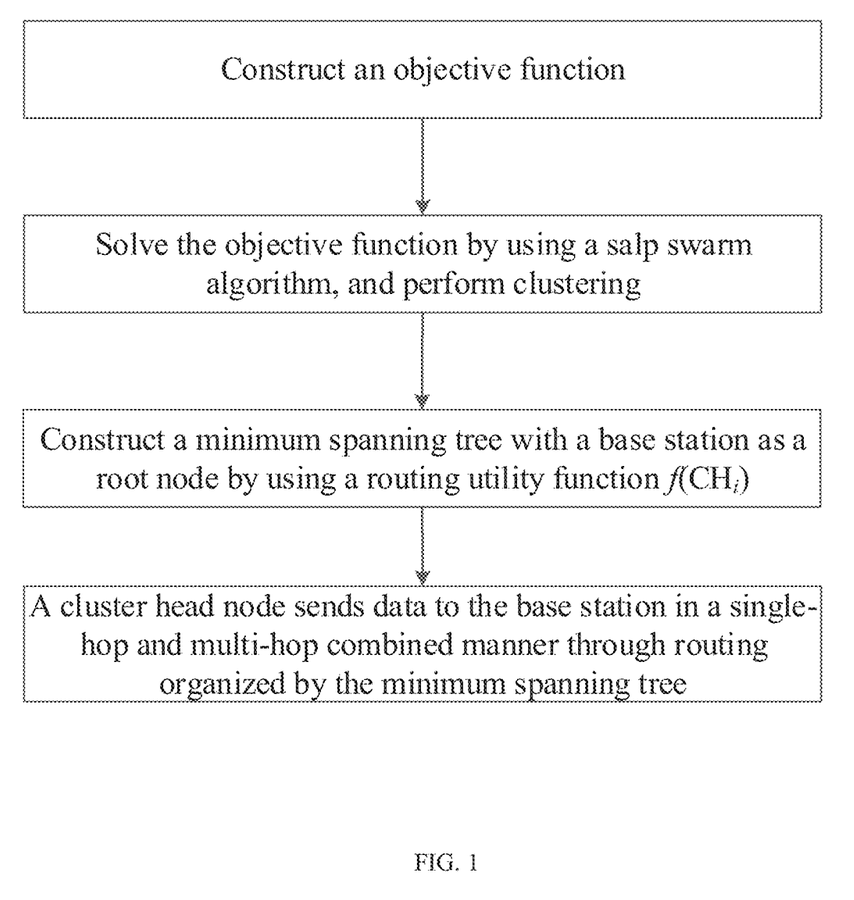
FIG. 1 is a flowchart of a method according to Embodiment 1.
Figure 2:
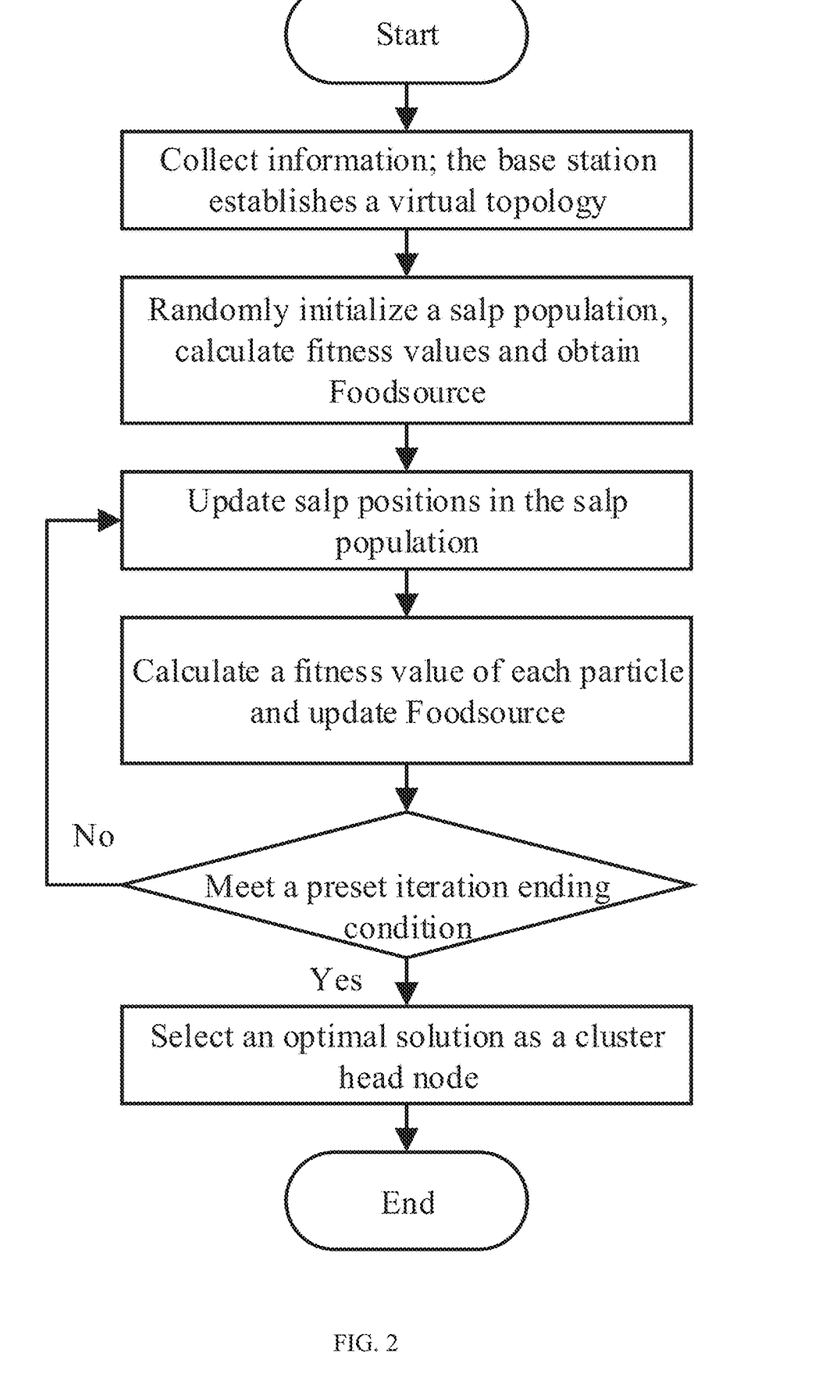
FIG. 2 is a flowchart of optimization of a salp swarm algorithm according to Embodiment 1.

As shown in FIG. 1, a WSN clustering routing method based on optimization with salp swarm algorithm includes the following steps:

S1: Construct an objective function by comprehensively considering factors as follows: node residual energy, a distance between cluster head nodes, a distance between a cluster member node and a cluster head node, a distance from a node to a base station, and the number of cluster head nodes.

S2: Solve the objective function by using a salp swarm algorithm, to find an optimal clustering scheme, and thus divide the WSN into non-uniform clusters, wherein in each cluster, the cluster member node sends data to the cluster head node in a single-hop manner.

S3: Construct a minimum spanning tree with the base station as a root node by using a routing utility function $f(CH_i)$.

S4: The cluster head node sends data to the base station in a single-hop and multi-hop combined manner through routing organized by the minimum spanning tree.

The WSN clustering routing method based on optimization with salp swarm algorithm of this embodiment is operated by "rounds", and each round is divided into a cluster formation stage and a data transmission stage.

In the cluster formation stage is specifically described below. The objective function is expressed as follows:

$$\min f_{obj} = \omega_1 \cdot f_1 + \omega_2 \cdot f_2 + \omega_3 \cdot f_3 \quad (1)$$

$$f_1 = \Sigma_{i=1}^N E(n_i)/\Sigma_{j=1}^N E(CH_{s,j}) \quad (2)$$

$$f_2 = \frac{\max_{\forall j=1,2,\ldots,K}\{\Sigma_{\forall n_i \in CH_{s,j}} d(n_i, CH_{s,j})/|CH_{s,j}|\}}{\min_{\forall j=1,2,\ldots,K}\left\{\sum_{k=1}^K d(CH_{s,k}, CH_{s,j})\right\}} \quad (3)$$

$$f_3 = K/N \quad (4)$$

wherein $f_1$ represents an energy evaluation factor of a candidate cluster head node; $\Sigma_{i=1}^N E(n_i)$ represents total initial energy of all nodes in the WSN; $\Sigma_{j=1}^K E(CH_{s,j})$ represents total energy of all candidate cluster head nodes in a current round; $f_2$ represents a clustering quality evaluation factor;

$$\max_{\forall j=1,2,\ldots,K}\{\Sigma_{\forall n_i \in CH_{s,j}} d(n_i, CH_{s,j})/|CH_{s,j}|\}$$

represents an intra-cluster compactness evaluation factor, and a value thereof is a maximum value of average Euclidean distances for all clusters and each average Euclidean distance is an average of Euclidean distances for each cluster from cluster member nodes to the cluster head node in the cluster;

$$\min_{\forall j=1,2,\ldots,K}\left\{\sum_{k=1}^K d(CH_{s,k}, CH_{s,j})\right\}$$

represents a cluster head dispersity evaluation factor, and a value thereof is a minimum value of distances between cluster head nodes; $f_3$ represents a cluster head quantity evaluation factor; K represents the number of clusters; N represents the number of nodes in the WSN; $n_i$ represents the i-th node; $CH_{s,j}$ represents the j-th cluster head node; $CH_{s,k}$ represents the k-th cluster head node; s represents the s-th salp search particle; $E(n_i)$ represents residual energy of the i-th node; $d(n_i, CH_{s,k})$ represents a minimum Euclidean distance between node i and cluster head node k; $d(CH_{s,j}, CH_{s,k})$ represents a minimum Euclidean distance between cluster head node j and cluster head node k; $\omega_1$ represents a weight coefficient of $f_1$, $\omega_2$ represents a weight coefficient of $f_2$, and $\omega_3$ represents a weight coefficient of $f_3$, and $\omega_1+\omega_2+\omega_3=1$.

Further, in the specific embodiment, providing that the WSN includes N nodes, the WSN is divided into K clusters, and the number of candidate cluster head nodes is M, and M»K; then there are $C_M^K$ clustering schemes, and determining an optimal clustering scheme is considered as an optimization problem, which is solved by using the salp swarm algorithm; each salp represents one possible clustering scheme, and performance of the possible clustering scheme is evaluated by using the objective function; Pops salps are used to form a search swarm to search for an optimal solution in $C_M^K$ possible cluster head combinations, to obtain a minimum value of the objective function.

Further, solving the optimization problem by using the salp swarm algorithm is specifically as follows:

D1: Initialize salp positions in a salp population randomly, and on the assumption that a salp population size is Pops, define positions of salps in an N-dimensional search space, where N represents the number of nodes in the WSN. ub=[$ub_1$, $ub_2$, . . . , $ub_N$] represents an upper limit of a position change range in each dimension, and lb=[$lb_1$, $lb_2$, . . . , $lb_N$] represents a lower limit of the position change range in each dimension. At the same time, first Pops/2 salps are taken as leaders and the remaining Pops/2 salps are taken as followers; a fitness value of each salp particle is calculated according to formula (1) of the objective function, and a position of a particle with a minimum fitness value in the population is used as Foodsource.

D2: Update the salp positions in the salp population, where salp particles update their own positions.

A position updating formula for the leaders is as follows:

$$\text{leader}_i^j = \begin{cases} F_i + r_1 \cdot ((ub_i - lb_i) \cdot r_2 + lb_i), r_3 \geq 0.5 \\ F_i - r_1 \cdot ((ub_i - lb_i) \cdot r_2 + lb_i), r_3 < 0.5 \end{cases} \quad (5)$$

wherein $\text{leader}_i^j$ is a position of the j-th leader in the i-th dimensional space, $ub_i$ and $lb_i$ are an upper limit and a lower limit corresponding to the i-th dimensional position respectively; $F_i$ is a position of Foodsource in the i-th dimensional space, coefficient $r_1$ is an adaptively reduced regulation parameter, which is responsible for balancing global searching and local searching capabilities of the algorithm, and $r_1$ is expressed as follows:

$$r_1 = 2e^{-(4t/T)^2} \quad (6)$$

wherein t represents a current number of iterations; T represents a maximum number of iterations. Coefficients $r_2$ and $r_3$ are random numbers in a range of [0, 1], which determine a movement direction and a movement distance of the j-th particle at a next position in the i-th dimensional space.

A position updating formula for the followers is as follows:

$$\text{follower}_i^j = \frac{1}{2} \cdot (x_i^j + x_i^{j-1}) \quad (7)$$

wherein $\text{follower}_i^j$ represents a position of the j-th follower in the i-th dimensional space, $x_i^j$ and $x_i^{j-1}$ represent positions of two salp particles in front of the j-th follower $\text{follower}_i^j$.

D3: Convert, by using a conversion function, real-number values of position-updated particles in each dimension into discrete values of 0 or 1, where the used conversion function is expressed as follows:

$$T(x_i^j(t)) = 1/(1 + \exp^{-x_i^j(t)}) \quad (8)$$

$$x_i^j(t+1) = \begin{cases} 1, rand < T(v_i^j(t+1)) \\ 0, rand \geq T(v_i^j(t+1)) \end{cases} \quad (9)$$

wherein $x_i^j(t+1)$ represents a position of a leader $\text{leader}_i^j(t)$ or a follower $\text{follower}_i^j(t)$ after the (t+1)-th iteration, T $(x_i^j(t))$represents a conversion probability corresponding to $x_i^j$ in the t-th iteration, and when a value thereof is greater than a random number rand, a value of $x_i^j(t+1)$ is 1, indicating that the i-th node is selected as a cluster head node; when the value of T $(x_i^j(t))$ is less than or equal to the random number rand, the value of T $(x_i^j(t+1))$ is 0, indicating that the i-th node is selected as the cluster member node, where rand is a random number in a range of [0, 1].

D4: Calculate fitness values of updated salp particles according to formula (1) of the objective function, and at the same time save a position of a particle with a minimum fitness value in the current population as Foodsource.

D5: Determine whether a preset iteration ending condition is met; if yes, perform a next step; otherwise, return to step D2.

D6: Use a final position of Foodsource as an optimal clustering scheme, and select a node corresponding to a dimension in which a value of Foodsource is 1 as a cluster head node.

In the data transmission stage, since the energy consumption of data transmission increases exponentially with distances from nodes, a backbone WSN needs to be formed among cluster heads to realize a multi-hop communication mode to reduce energy consumption. By establishing multiple path trees, only the root node of each path needs to perform long-distance communication with the base station, while other cluster heads only need to perform short-distance communication with the next hop cluster head within their own communication ranges. Therefore, in this embodiment, a minimum spanning tree with the base station as a root node is constructed by using a routing utility function $f(CH_i)$, and the cluster head sends data to the base station in a single-hop and multi-hop combined manner through routing organized by the minimum spanning tree.

The routing utility function $f(CH_i)$ is expressed as follows:

$$p_i = \begin{cases} \sin k, d(i, \sin k) < 2r \\ j, d(i, \sin k) \geq 2r \end{cases} \quad (10)$$

$$j = \arg \min\{\cos t(k), \forall k \in A_i \text{ and } d(k, \sin k) < d(i, \sin k)\} \quad (11)$$

$$\cos t(k) = w \cdot \frac{d^2(i, k) + d^2(k, \sin k)}{d^2(i, \sin k)} + (1-w) \cdot \frac{\overline{E}_{nei}(i)}{E_{cur}(k)} \quad (12)$$

wherein $\overline{E}_{nei}(i)$ represents average energy of all neighboring nodes of node i, and $E_{cur}(k)$ represents a current energy state of node k; $A_i$ represents a set of all neighboring cluster head nodes of cluster head node i; w represents a weigh coefficient and w=0.4; d(•) represents a minimum Euclidean distance between two nodes.

Function $f(CH_i)$ represents a routing utility function for a current cluster head $CH_i$ to select a next cluster head $CH_j$. Within the communication range of the cluster node $CH_i$, the cluster head $CH_j$ relatively far away from the cluster node $CH_i$ and close to the base station is selected, and higher residual energy of the selected cluster head corresponds to a larger utility function value. Therefore, it is more likely to be elected as a next hop in routing.

The salp swarm algorithm used in this embodiment has advantages such as being simple, high portability, high precision, and fast convergence, and is applicable to the selection of cluster heads. Therefore, a WSN clustering routing method based on optimization with salp swarm algorithm is proposed, in which nodes in the WSN are grouped into multiple clusters with non-uniform scales. According to the algorithm, during cluster head selection, an objective function is constructed by comprehensively considering factors such as node residual energy, a distance between cluster head nodes, a distance between the cluster member node and the cluster head, a distance from a node to a base station, and the number of cluster head nodes, and the objective function is solved by using a salp swarm algorithm (SSA), to find an optimal clustering scheme, thus dividing the whole WSN into non-uniform clusters, the cluster member node sends data to a cluster head in a single-hop manner; then, a minimum spanning tree with the base station as a root node is constructed by using a routing utility function $f(CH_i)$; and the cluster head sends data to the base station in a single-hop and multi-hop combined manner through routing organized by the minimum spanning tree. This algorithm can effectively balance energy consumption of nodes, and achieve the objective of effectively extending the WSN lifespan.

To verify the performance of the proposed routing protocol, a SEP method is simulated in the same condition by using MATLAB [G. Smaragdakis, I. Matta, and A. Bestavros, "SEP: A stable election protocol for clustered heterogeneous wireless sensor WSNs," Boston University Computer Science Department, 2004]; DDEEC method [B. Elbhiri, R. Saadane, and D. Aboutajdine, "Developed Distributed Energy-Efficient Clustering (DDEEC) for heterogeneous wireless sensor WSNs," in 2010 5th International Symposium On I/V Communications and Mobile WSN, IEEE, Rabat, Morocco, September 2010, pp. 1-4]; BEECP method [R. Pal, H. M. A. Pandey, and M. Saraswat, "BEECP: Biogeography optimization-based energy efficient clustering protocol for HWSNs," in 2016 Ninth International Conference on Contemporary Computing (IC3), IEEE, Noida, India, August 2016, pp. 1-6], and multiple performance indexes are compared. Computer configuration of the experimental environment is as follows: CPU: CoreI7-8700, memory: 16G, and operating system: Windows10. Experiment parameters used in the experiment are shown in Table 1

TABLE 1

List of WSN Simulation Parameters

| Parameter description | Parameter name | Parameter value |
|---|---|---|
| Area of region | L × L | 100 × 100 m² |
| Number of nodes | N | 100 |

TABLE 1-continued

List of WSN Simulation Parameters

| Parameter description | Parameter name | Parameter value |
|---|---|---|
| Coordinates of base station | Sink | 50 × 50 |
| Initial energy of node | $E_0$ | 0.5 J |
| Percentage of advanced nodes | m | 0.1 |
| Energy factor of advanced nodes | a | 1 |
| Energy consumed for transmission of each bit | $E_{elec}$ | 50 nJ/bit |
| Amplifying power of free space model | $E_{fs}$ | 10 pJ/bit/m² |
| Amplifying power of multi-path model | $E_{mp}$ | 0.0013 pJ/bit/m⁴ |
| Energy consumed by data fusion | $E_{DA}$ | 5 nJ/bit/packet |
| Data packet size | Packetsize | 4000 bits |
| Salp population size | Pops | 20 |
| Number of iterations | MaxGen | 20 |

Figure 3:
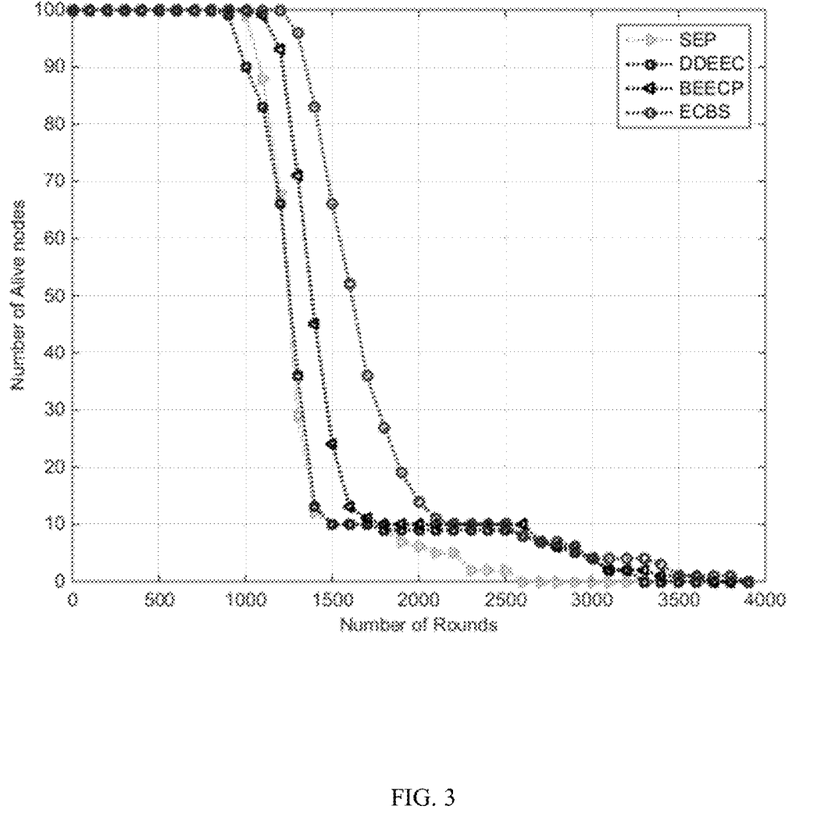
FIG. 3 shows the number of survival nodes in each round according to Embodiment 1.

FIG. 3 shows the number of survival nodes in each round in 4 routing protocols. As can be seen in FIG. 3, the method proposed in this embodiment (denoted by ECBS) is effective in extending the lifespan of the WSN, especially the stabilization period of the WSN, compared to the other three methods. The lifespan of the WSN is recorded in Table 2. From Table 2, it can be seen that the first dead node of the ECBS method appears in the $1224^{th}$ round and the last dead node appears in the $3872^{nd}$ round, which is superior to the other three routing methods. Table 3 shows percentages of increases in the WSN stability period and WSN lifespan achieved by the ECBS method with respect to the other three protocols. As shown in Table 3, the WSN stability period in the ECBS protocol grows by 29.5%, 36.9%, and 11.9% relative to the three algorithms SEP, DEEC, and BEECP, respectively. The WSN lifespan in the ECBS protocol grows by 54.6%, 17.7% and 6.4% relative to the three algorithms SEP, DDEEC and BEECP, respectively. From the above experimental results, it can be seen that the routing protocol proposed in this embodiment can effectively extend the overall WSN lifespan through the optimization of the clustering algorithm.

TABLE 2

Percentage of Dead Nodes

| Sr. no | Percentage of dead nodes | Number of rounds | | | |
|---|---|---|---|---|---|
| | | SEP | DDEEC | BEECP | ECBS |
| 1 | 1% | 945 | 894 | 1094 | 1224 |
| 2 | 50% | 1234 | 1256 | 1371 | 1615 |
| 3 | 80% | 1345 | 1347 | 1531 | 1888 |
| 4 | 100% | 2505 | 3290 | 3636 | 3872 |

TABLE 3

Comparison between WSN Stability Period and Lifespan

| No | Protocols | Increase in Stability period of ECBS | Increase in WSN lifespan of ECBS |
|---|---|---|---|
| 1 | SEP | 29.5% | 54.6% |
| 2 | DDEEC | 36.9% | 17.7% |
| 3 | BEECP | 11.9% | 6.4% |

TABLE 4

Comparison of Residual Energy

| Sr. no | Number of Rounds | Total residual energy (in Joule) | | | |
|---|---|---|---|---|---|
| | | SEP | DDEEC | BEECP | ECBS |
| 1 | 1 | 54.9573 | 54.9582 | 54.9647 | 54.9678 |
| 2 | 200 | 46.5422 | 46.9808 | 47.5985 | 48.5355 |
| 3 | 1000 | 12.7360 | 13.3023 | 17.9166 | 22.8027 |
| 4 | 2000 | 0.5044 | 2.4901 | 2.6656 | 3.0174 |

Figure 4:
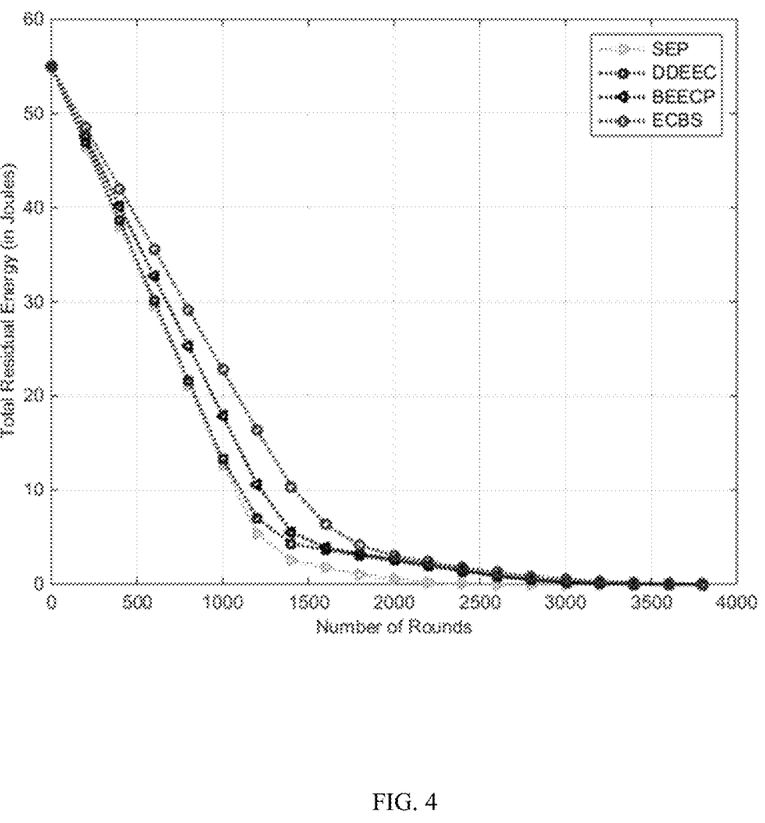
FIG. 4 shows residual energy of a WSN according to Embodiment 1.
Figure 5:
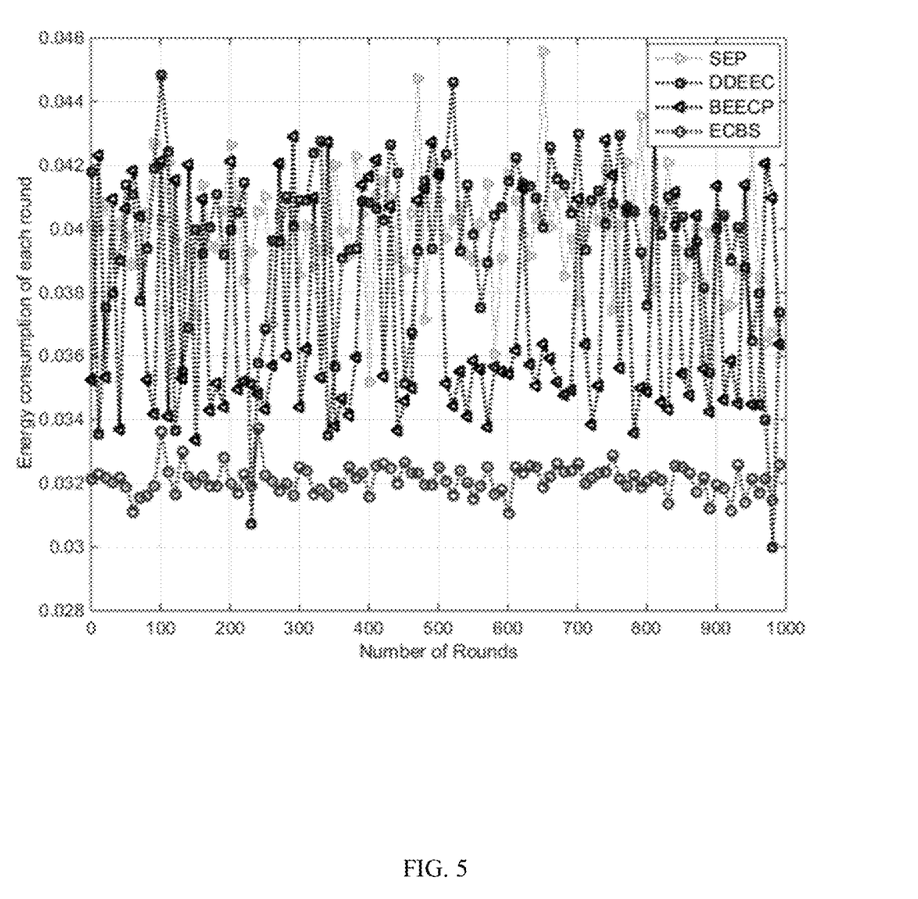
FIG. 5 shows average energy consumption in each round according to Embodiment 1.

FIG. 4 shows the residual energy status of the wireless WSN over the entire lifespan, with all the protocols for comparison having the same initial energy. From FIG. 4, it can be seen that the ECBS method achieves significantly higher residual energy than the other three routing protocols throughout the lifespan. The specific residual energy values in each method in rounds 1, 200, 1000 and 2000 recorded in Table 4 also show that the ECBS method has more residual energy in the same time period. Also, as shown in FIG. 5, the average energy consumption of the ECBS protocol in each round is the lowest among the four routing protocols. This is because on the one hand, the proposed routing algorithm in this embodiment uses the SSA to optimize the clustering scheme, which allows the WSN to select the most suitable nodes as cluster heads to balance the energy consumption of the whole WSN. On the other hand, the designed objective function ensures that fewer cluster head nodes are selected in each round, thus reducing the average energy consumption of the entire WSN.

Figure 6:
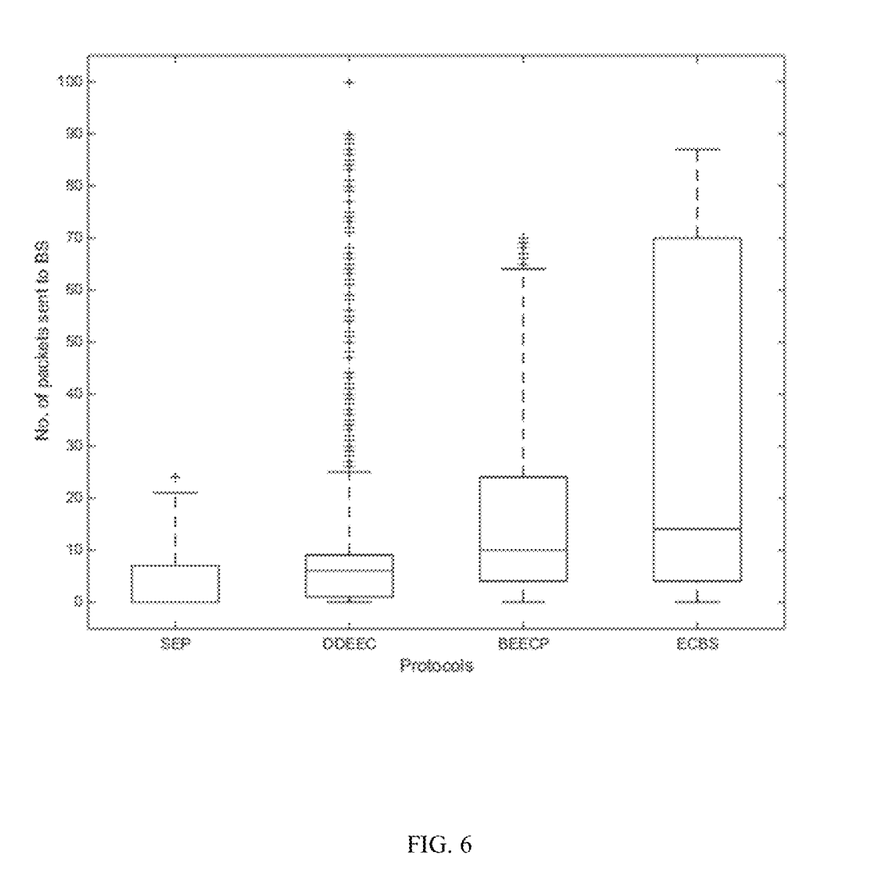
FIG. 6 shows the number of data packets received by a base station according to Embodiment 1.

As shown in FIG. 6, the number of packets delivered to the base station by the four routing protocols in each round. From FIG. 6, it can be observed that the ECBS method can deliver the largest number of packets relative to the other three methods. The main reason is that the routing technique proposed in this embodiment can effectively balance the energy consumption of the whole WSN based on optimization by the SSA, such that the WSN consumes less energy per round and works for a longer time compared to the other three protocols. In addition, the minimum spanning tree established by the ECBS method in the data transmission stage can also improve the reliability of the WSN transmission and maximize the data throughput of the WSN by combining single-hop and multi-hop data transmission.

In summary, the SSA-based WSN clustering routing method proposed in this embodiment is significantly superior to the other three compared methods in terms of the WSN lifespan, average energy consumption per round, stability period and data throughput.

It is apparent that the above embodiments are merely intended to describe the present disclosure clearly, rather than to limit the implementations of the present disclosure. Any modification, equivalent substitution and improvement made within the spirit and principle of the present disclosure should fall within the protection scope of the claims of the present disclosure.

We claim:

1. A wireless sensor network (WSN) clustering routing method based on optimization with salp swarm algorithm, comprising the following steps:

S1: constructing an objective function by comprehensively considering factors as follows: node residual energy, a distance between cluster head nodes, a distance between a cluster member node and a cluster head node, a distance from a node to a base station, and a number of cluster head nodes;

S2: solving the objective function by using a salp swarm algorithm, to find an optimal clustering scheme, and thus dividing the WSN into non-uniform clusters, wherein in each cluster, the cluster member node sends data to the cluster head node in a single-hop manner;

S3: constructing a minimum spanning tree with the base station as a root node by using a routing utility function $f(CH_i)$;

S4: sending, by the cluster head node, data to the base station in a single-hop and multi-hop combined manner through routing organized by the minimum spanning tree.

2. The method according to claim 1, wherein the objective function is expressed as follows:

$$\min f_{obj} = \omega_1 \cdot f_1 + \omega_2 \cdot f_2 + \omega_3 \cdot f_3 \quad (1)$$

$$f_1 = \Sigma_{i=1}^{N} E(n_i) / \Sigma_{j=1}^{N} E(CH_{s,j}) \quad (2)$$

$$f_2 = \frac{\max_{\forall j=1,2,\ldots,K} \{\Sigma_{\forall n_i \in CH_{s,j}} d(n_i, CH_{s,j}) / |CH_{s,j}|\}}{\min_{\forall j=1,2,\ldots,K} \left\{\sum_{k=1}^{K} d(CH_{s,k}, CH_{s,j})\right\}} \quad (3)$$

$$f_3 = K/N \quad (4)$$

wherein $f_1$ represents an energy evaluation factor of a candidate cluster head node; $\Sigma_{i=1}^{N} E(n_i)$ represents total initial energy of all nodes in the WSN; $\Sigma_{j=1}^{K} E(CH_{s,j})$ represents total energy of all candidate cluster head nodes in a current round; $f_2$ represents a clustering quality evaluation factor;

$$\max_{\forall j=1,2,\ldots,K} \{\Sigma_{\forall n_i \in CH_{s,j}} d(n_i, CH_{s,j}) / |CH_{s,j}|\}$$

represents an intra-cluster compactness evaluation factor, and a value thereof is a maximum value of average Euclidean distances for all clusters and each average Euclidean distance is an average of Euclidean distances for each cluster from cluster member nodes to the cluster head node in the cluster;

$$\min_{\forall j=1,2,\ldots,K} \left\{\sum_{k=1}^{K} d(CH_{s,k}, CH_{s,j})\right\}$$

represents a cluster head dispersity evaluation factor, and a value thereof is a minimum value of distances between cluster head nodes; $f_3$ represents a cluster head quantity evaluation factor; K represents a number of clusters; N represents a number of nodes in the WSN; $n_i$ represents an i-th node; $CH_{s,j}$ represents a j-th cluster head node; $CH_{s,k}$ represents a k-th cluster head node; s represents an s-th salp search particle; $E(n_i)$ represents residual energy of the i-th node; $d(n_i, CH_{s,k})$ represents a minimum Euclidean distance between node i and cluster head node k; $d(CH_{s,j}, CH_{s,k})$ represents a minimum Euclidean distance between cluster head node j and cluster head node k; $\omega_1$ represents a weight coefficient of $f_1$, $\omega_2$ represents a weight coefficient of $f_2$, and $\omega_3$ represents a weight coefficient of $f_3$, and $\omega_1+\omega_2+\omega_3=1$.

3. The method according to claim 2, wherein providing that the WSN comprises N nodes, the WSN is divided into K clusters, the number of candidate cluster head nodes is M, and M»K; then there are $C_M^K$ clustering schemes, and determining an optimal clustering scheme is considered as an optimization problem, which is solved by using the salp swarm algorithm; each salp represents one possible clustering scheme, and performance of the possible clustering scheme is evaluated by using the objective function; Pops salps are used to form a search swarm to search for an optimal solution in $C_M^K$ possible cluster head combinations, to obtain a minimum value of the objective function.

4. The method according to claim 3, wherein solving the optimization problem by using the salp swarm algorithm is specifically as follows:

D1: initializing salp positions in a salp population randomly;

D2: updating the salp positions in the salp population;

D3: converting, by using a conversion function, real-number values of position-updated particles in each dimension into discrete values of 0 or 1;

D4: calculating fitness values of updated salp particles according to formula (1) of the objective function, and saving a position of a particle with a minimum fitness value in the current population as Foodsource;

D5: determining whether a preset iteration ending condition is met; if yes, performing a next step; otherwise, returning to step D2; and D6: using a final position of Foodsource as an optimal clustering scheme, and selecting a node corresponding to a dimension in which a value of Foodsource is 1 as the cluster head node.

5. The method according to claim 4, wherein step D1 of initializing the salp positions in the salp population randomly specifically comprises:

assuming that a salp population size is Pops, defining positions of salps in an N-dimensional search space, wherein N represents the number of nodes in the WSN, ub=[$ub_1$, $ub_2$, . . . , $ub_N$] represents an upper limit of a position change range of each dimension, and lb=[$lb_1$, $lb_2$, . . . $lb_N$] represents a lower limit of the position change range in each dimension; taking first Pops/2 salps as leaders and the remaining Pops/2 salps as followers; calculating the fitness value of each salp particle according to formula (1) of the objective function, and using the position of the particle with the minimum fitness value in the population as Foodsource.

6. The method according to claim 5, wherein a position updating formula for the leaders is as follows:

$$\text{leader}_i^j = \begin{cases} F_i + r_1 \cdot ((ub_i - lb_i) \cdot r_2 + lb_i), & r_3 \geq 0.5 \\ F_i - r_1 \cdot ((ub_i - lb_i) \cdot r_2 + lb_i), & r_3 < 0.5 \end{cases} \quad (5)$$

wherein leader$_i^j$ is a position of a j-th leader in an i-th dimensional space, $ub_i$ and $lb_i$ are an upper limit and a lower limit corresponding to an i-th dimensional position respectively; $F_i$ is a position of Foodsource in the i-th dimensional space, coefficient $r_1$ is an adaptively reduced regulation parameter, which is responsible for balancing global searching and local searching capabilities of the algorithm, and $r_1$ is expressed as follows:

$$r_1 = 2e^{-(4t/T)^2} \quad (6)$$

wherein t represents a current number of iterations; T represents a maximum number of iterations; coefficients $r_2$ and $r_3$ are random numbers in a range of [0, 1], which determine a movement direction and a movement distance of a j-th particle at a next position in the i-th dimensional space.

7. The method according to claim 6, wherein a position updating formula for the followers is as follows:

$$\text{follower}_i^j = \frac{1}{2} \cdot (x_i^j + x_i^{j-1}) \quad (7)$$

wherein follower$_i^j$ represents a position of a j-th follower in the i-th dimensional space, $x_i^j$ and $x_i^{j-1}$ represent positions of two salp particles in front of the j-th follower follower$_i^j$.

8. The method according to claim 7, wherein the conversion function is expressed as follows:

$$T(x_i^j(t)) = 1/(1 + \exp^{-x_i^j(t)}) \quad (8)$$

$$x_i^j(t+1) = \begin{cases} 1, & rand < T(v_i^j(t+1)) \\ 0, & rand \geq T(v_i^j(t+1)) \end{cases} \quad (9)$$

wherein $x_i^j$(t+1) represents a position of a leader leader$_i^j$(t) or a follower follower$_i^j$(t) after a (t+1)-th iteration, T ($x_i^j$(t)) represents a conversion probability corresponding to $x_i^j$ in a t-th iteration, and when a value of the conversion probability is greater than a random number rand, a value of $x_i^j$(t+1) is 1, indicating that the i-th node is selected as the cluster head node; when the value of T ($x_i^j$(t)) is less than or equal to the random number rand, the value of $x_i^j$(t+1) is 0, indicating that the i-th node is selected as the cluster member node, and rand is a random number in a range of [0, 1].

9. The method according to claim 8, wherein the routing utility function $f(CH_i)$ is expressed as follows:

$$p_i = \begin{cases} \sin k, & d(i, \sin k) < 2r \\ j, & d(i, \sin k) \geq 2r \end{cases} \quad (10)$$

$$j = \arg \min\{\cos t(k), \forall k \in A_i \text{ and } d(k, \sin k) < d(i, \sin k)\} \quad (11)$$

$$\cos t(k) = w \cdot \frac{d^2(i, k) + d^2(k, \sin k)}{d^2(i, \sin k)} + (1 - w) \cdot \frac{\overline{E}_{nei}(i)}{E_{cur}(k)} \quad (12)$$

wherein $\overline{E}_{nei}$(i) represents average energy of all neighboring nodes of node i, and $E_{cur}$(k) represents a current energy state of node k; $A_i$ represents a set of all neighboring cluster head nodes of cluster head node i; w represents a weigh coefficient and w=0.4; d(•) represents a minimum Euclidean distance between two nodes.

* * * * *